US008813162B2

(12) United States Patent
Shigeta

(10) Patent No.: US 8,813,162 B2
(45) Date of Patent: Aug. 19, 2014

(54) INFORMATION RECEIVING APPARATUS, DATA DOWNLOADING METHOD, AND INFORMATION RECEIVING SYSTEM

(75) Inventor: Saya Shigeta, Yokohama (JP)

(73) Assignee: Kyocera Corporation, Kyoto (JP)

(*) Notice: Subject to any disclaimer, the term of this patent is extended or adjusted under 35 U.S.C. 154(b) by 190 days.

(21) Appl. No.: 11/461,366

(22) Filed: Jul. 31, 2006

(65) Prior Publication Data

US 2007/0043867 A1 Feb. 22, 2007

(30) Foreign Application Priority Data

Aug. 2, 2005 (JP) ................................. 2005-223923

(51) Int. Cl.
| H04N 7/173 | (2011.01) |
| H04N 7/16 | (2011.01) |
| G06F 12/00 | (2006.01) |
| G06F 15/16 | (2006.01) |
| G06F 15/167 | (2006.01) |

(52) U.S. Cl.
USPC .............. 725/134; 725/142; 711/1; 711/100; 709/201; 709/212; 709/213

(58) Field of Classification Search
USPC .................................. 725/109, 115, 134, 142
See application file for complete search history.

(56) References Cited

U.S. PATENT DOCUMENTS

| 5,652,613 | A | 7/1997 | Lazarus et al. |
| 6,430,607 | B1* | 8/2002 | Kavner .......................... 709/217 |
| 6,510,138 | B1* | 1/2003 | Pannell .......................... 370/236 |
| 6,772,233 | B2* | 8/2004 | Iida et al. ........................ 710/13 |
| 7,062,543 | B2 | 6/2006 | Kishimoto |
| 7,117,294 | B1* | 10/2006 | Mi et al. ......................... 711/101 |
| 7,185,011 | B1* | 2/2007 | Dujari .................................. 1/1 |
| 7,287,088 | B1* | 10/2007 | Anderson ...................... 709/235 |
| 2002/0030853 | A1* | 3/2002 | Kizaki et al. ................. 358/1.16 |
| 2002/0049826 | A1 | 4/2002 | Ariga |
| 2004/0140946 | A1* | 7/2004 | Shih .............................. 345/1.1 |
| 2004/0183903 | A1* | 9/2004 | Pedersen ....................... 348/143 |
| 2005/0129042 | A1* | 6/2005 | Muhonen et al. ............. 370/412 |

(Continued)

FOREIGN PATENT DOCUMENTS

| CN | 1187279 A | 7/1998 |
| JP | 10133932 A | 5/1998 |

(Continued)

OTHER PUBLICATIONS

Chinese language office action and its English language translation for corresponding Chinese application 200610110085.4 lists the references above.

(Continued)

Primary Examiner — Ricky Chin
(74) Attorney, Agent, or Firm — DLA Piper LLP (US)

(57) ABSTRACT

An information receiving apparatus includes: a communication unit; a storage unit that stores data; a data acquisition unit that acquires distribution data that are received via the communication unit and stores the distribution data in a prescribed storage area of the storage unit that is determined in advance; and a control unit that, prior to the communication unit receiving the distribution data, performs a storage area securing process that secures a storage area by deleting data that are stored in the prescribed storage area of the storage unit or by transferring the data to another storage area of the storage unit.

14 Claims, 4 Drawing Sheets

(56) References Cited

U.S. PATENT DOCUMENTS

| | | | |
|---|---|---|---|
| 2005/0216952 A1* | 9/2005 | Johnson | 725/147 |
| 2005/0232610 A1* | 10/2005 | Boger et al. | 386/125 |
| 2006/0026653 A1* | 2/2006 | Matsunami | 725/81 |
| 2006/0041927 A1* | 2/2006 | Stark et al. | 725/139 |
| 2006/0136548 A1 | 6/2006 | Nishio et al. | |
| 2006/0204207 A1* | 9/2006 | Gilge | 386/46 |
| 2007/0078951 A1* | 4/2007 | Murai et al. | 709/217 |
| 2008/0005760 A1* | 1/2008 | Kay et al. | 725/1 |
| 2008/0155203 A1* | 6/2008 | Aguilar et al. | 711/147 |
| 2008/0254780 A1* | 10/2008 | Kuhl et al. | 455/418 |

FOREIGN PATENT DOCUMENTS

| | | | |
|---|---|---|---|
| JP | 2001350631 A | 12/2001 | |
| JP | 2002116945 A | 4/2002 | |
| JP | 2004102698 A | 4/2004 | |
| JP | 2004110228 A | 4/2004 | |
| JP | 2004-297126 | 10/2004 | |
| KR | 10-1998-069209 | 10/1998 | |
| WO | 9641470 A1 | 12/1996 | |

OTHER PUBLICATIONS

Japanese language office action and its English language translation for corresponding Japanese application 2005223923 lists the references above.

Chinese language decision of rejection dated Dec. 26, 2011 and its English language translation issued in corresponding Chinese application 200610110085.4

Japanese language official inquiry dated Apr. 1, 2012 and its English language translation issued in corresponding Japanese application 2005223923.

Japanese language office action (appeal decision) dated Sep. 18, 2012 and its English language translation issued in corresponding Japanese application 2005223923.

* cited by examiner

SERIES DATA

| INFORMATION IDENTIFIER | CLASSIFICATION NUMBER | REFERENCE FLAG |
|---|---|---|
| ENGLISH CONVERSATION LECTURE | 1 | 1 |
| ENGLISH CONVERSATION LECTURE | 2 | 1 |
| ENGLISH CONVERSATION LECTURE | 3 | 0 |
| ENGLISH CONVERSATION LECTURE | 4 | 0 |
| | | |

OTHER DATA

| INFORMATION IDENTIFIER | CLASSIFICATION NUMBER | REFERENCE FLAG |
|---|---|---|
| GERMAN LECTURE | 0 | 1 |
| COOKING PROGRAM | 0 | 0 |
| GOLF LESSON | 0 | 1 |
| | | |

INFORMATION RECEIVING APPARATUS, DATA DOWNLOADING METHOD, AND INFORMATION RECEIVING SYSTEM

BACKGROUND OF THE INVENTION

1. Field of the Invention

The present invention relates to an information receiving apparatus, a data downloading method, and an information receiving system.

Priority is claimed on Japanese Patent Application No. 2005-223923, filed Aug. 2, 2005, the content of which is incorporated herein by reference.

2. Description of Related Art

In recent years services have been provided for distributing television programs such as news, cartoons, dramas and music programs as moving picture data to portable terminals. In such a service, when the user registers a desired program, a reserved storage area for the distribution service is created in the storage unit of the portable terminal, and the program data are downloaded thereto. Since distribution of the program data is in principle preferably performed during a time when communications traffic is light, it is typically carried out in the late night hours while the user is asleep. The time of day at which the program data are automatically updated (automatic update time) is individually designated for each portable terminal by the information distribution server. When the automatic update time arrives, the download application in the portable terminal runs, confirms with the information distribution server whether the program has been updated, and executes the download if updated. Downloadable program data include informative programs such as news shows that are distributed daily or weekly, as well as series programs of which the number of episodes increases daily or weekly, and one-time programs that are distributed only once.

Adapting to the lifestyle patterns of users, there is known a portable terminal that can download and update data to the portable terminal during a time of day when the possibility of the user using the portable terminal is low (refer, for example, to Japanese Unexamined Patent Application, First Publication No. 2004-297126).

When downloading program data such as moving picture data like animation, since downloading is performed to the reserved storage area for the distribution service located in the storage unit that is set in the potable terminal, the previously downloaded moving picture data are overwritten. For this reason, the user is required to perform an operation to transfer the moving picture data that will be deleted by overwriting to another storage area that is not tee reserved storage area or to a detachable expandable memory (such as a SD card).

However, since moving picture data are often distributed daily or weekly, this operation by the user of transferring the moving pit data to be saved to another storage area becomes very troublesome. Also, since the receiving of distribution data needs to be performed at the time designated by the information distribution server, the act of storing cannot be performed at a uniquely prescribed time as TV programs are recorded. As a result, even if downloaded moving picture data have not been replayed even once, if the operation of transferring the data is forgotten, it will be written over by the newly distributed moving picture data, with the result that the communication expense for downloading the data will be wasted.

The present invention was achieved in view of the aforementioned circumstances, and has as its object to provide an information receiving apparatus, a data downloading method, and an information receiving system.

SUMMARY OF THE INVENTION

The present invention provides an intimation receiving apparatus including a communication unit; a storage unit that stores data; a data acquisition unit that acquires distribution data that are received via the communication unit and stores the distribution data in a prescribed storage area of the storage unit that is determined in advance; and a control unit that, prior to the communication unit receiving the distribution data, performs a storage area securing process that secures a storage area by deleting data that are stored in the prescribed storage area of the storage unit or by transferring file data to another storage area of the storage unit.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE INVENTION

Figure 1:
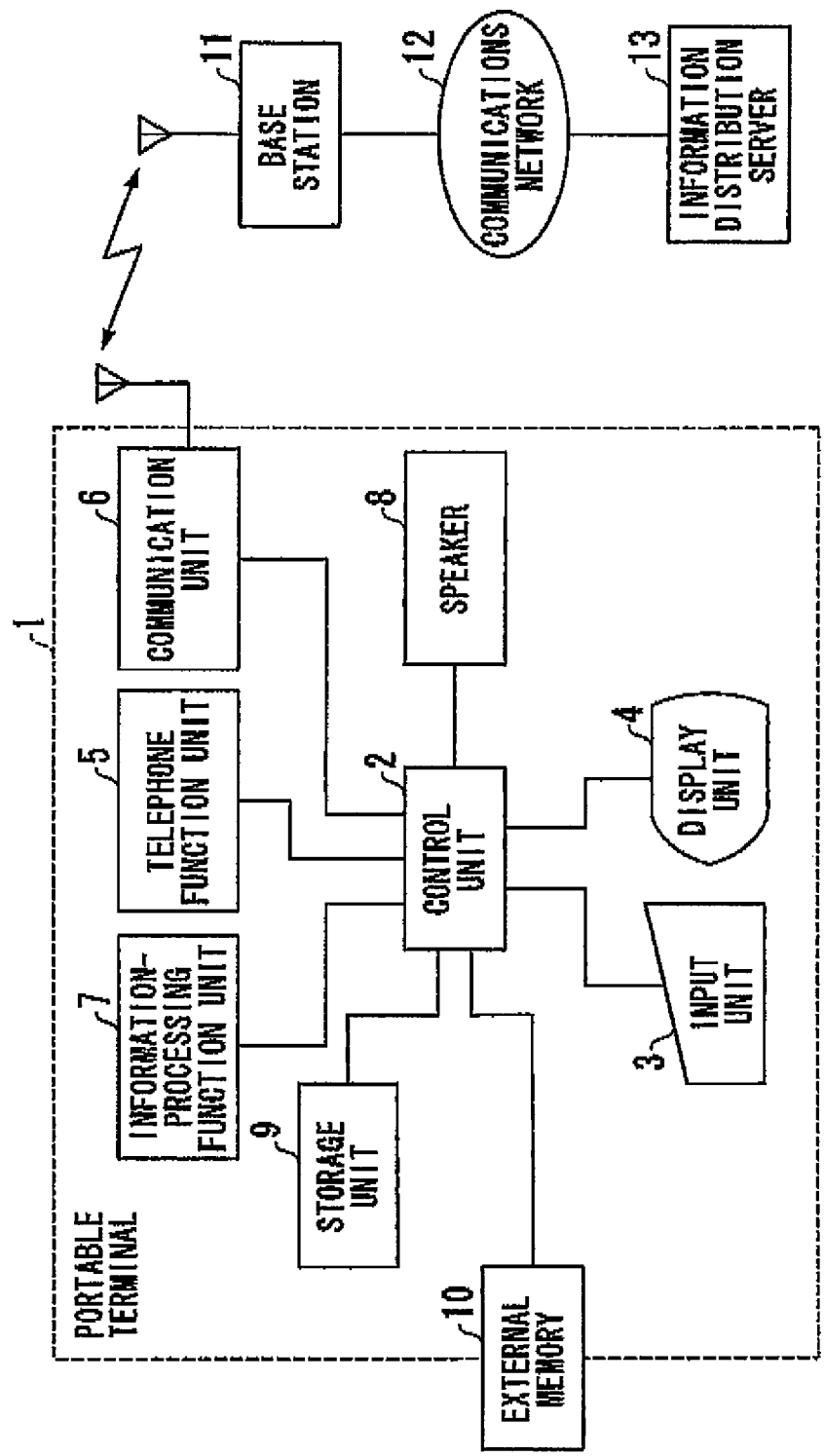
FIG. 1 is a block diagram showing the constitution of one embodiment of the present invention.

The information receiving apparatus according to one embodiment of the present invention is explained below with reference to the drawings. Here, the information receiving apparatus is described using a portable terminal an example. FIG. 1 is a block diagram showing the constitution of the same embodiment. In the drawing, reference numeral 1 is a portable terminal that is capable of mobile communications. Reference numeral 2 is a control unit that performs overall control of processing operations of the portable terminal 1. Reference numeral 3 is an input unit including dial keys and function keys. Reference numeral 4 is a display unit that constitutes a liquid crystal display or the like. Reference numeral 5 is a telephone function unit that is provided with a microphone for collecting the sound of the speaker's voice and a speaker for reproducing the sound of the other party's voice to realize mobile phone functionality. Reference numeral 6 is a communication unit that establishes a wireless communication line and performs telephonic communications and information communications. Reference numeral 7 is an information-processing function unit that performs information processing using a preinstalled application. Reference numeral 8 is a speaker for ring tones and audio that are played back based on downloaded data.

Reference numeral 9 is a storage unit that stores downloaded data. Reference numeral 10 is an expandable memory such as an external memory that is detachable from the portable terminal 1. Reference numeral 11 is a base station with which a wireless communication line is established with the communication unit 6. Reference numeral 12 is a communication network to which the base station 11 is connected.

Reference numeral 13 is an information distribution server that performs information distribution to the portable terminal 1.

The constitution of data stored in the storage unit 9 or the expandable memory 10 shown in FIG. 1 shall now be explained with reference to FIG. 5.

Data stored in the storage unit 9 or the expandable memory 10 include series data whose number increases daily or weekly, and another data such as one-time data. An information identifier, a classification number, and a reference flag associated with each data are stored in the storage unit 9. The information identifier includes an identification name such as "English conversation lecture", "Cooling program" and the like that is given to the downloaded data. The classification number is a number for classifying the number of episodes of series data. A classification number of "0" indicates a one-time data. The reference flag is a number assigned to downloaded data, being "1" when the data have already been played backs and "0" when the data have yet to be played back. The genuine downloaded data are stored in a separate storage area in the storage unit 9, being specified by the information identifier and the classification number that is stored in the storage unit 9.

Next, the operation of the daft update check between the portable terminal 1 and the information distribution server 13 shall be explained with reference to FIG. 4.

First, the information distribution server 13 sends the information of next scheduled update date and time when the portable terminal performed a data update check, and the portable terminal 1 performs a data update check on the information distribution server 13 at the point in time of the scheduled update date and time sent by the information distribution server 13 (step S31). Upon being checked, the information distribution server 13 notifies the portable terminal 1 whether or not there is moving picture data to be distributed and information of the next scheduled update date and time (step S32). At this time, the portable terminal 1 executes a data transfer process when there is distribution data to be downloaded (step S33). This data transfer process shall be explained in detail later. When the data transfer process is complete, the portable terminal 1 makes a download request to the information distribution server 13 (step S34), and executes the data download process (step S35). This download is performed at a time of day when traffic volume is light (generally in the late night hours while the user is asleep).

The timing of performing the data update check and the data transfer process (second timing) commences at a time of day designated beforehand by the information distribution server 13, and at the point in time when this data update check and data transfer process are completed (transmitting) the downloading of the data starts.

Or, in order to be able to start downloading of the data when the time of day designated beforehand by the information distribution server 13 is reached, the data update check and the data transfer process nay be performed prior to the time of day designated by the information distribution server 13, ad data at check and the data transfer process may be completed by the time of day designated by the information distribution server 13. In this case, a time of day (second timing) prior to the time of day (first timing) designated in advance by the information distribution server 13 by the processing period (prescribed period) required for the data update check and the data transfer process is set. By starting the update check and the transfer process when this time of day is reached, it is possible to start the download of the data when the time of day designated by the information distribution server 13 is reached.

Figure 2:
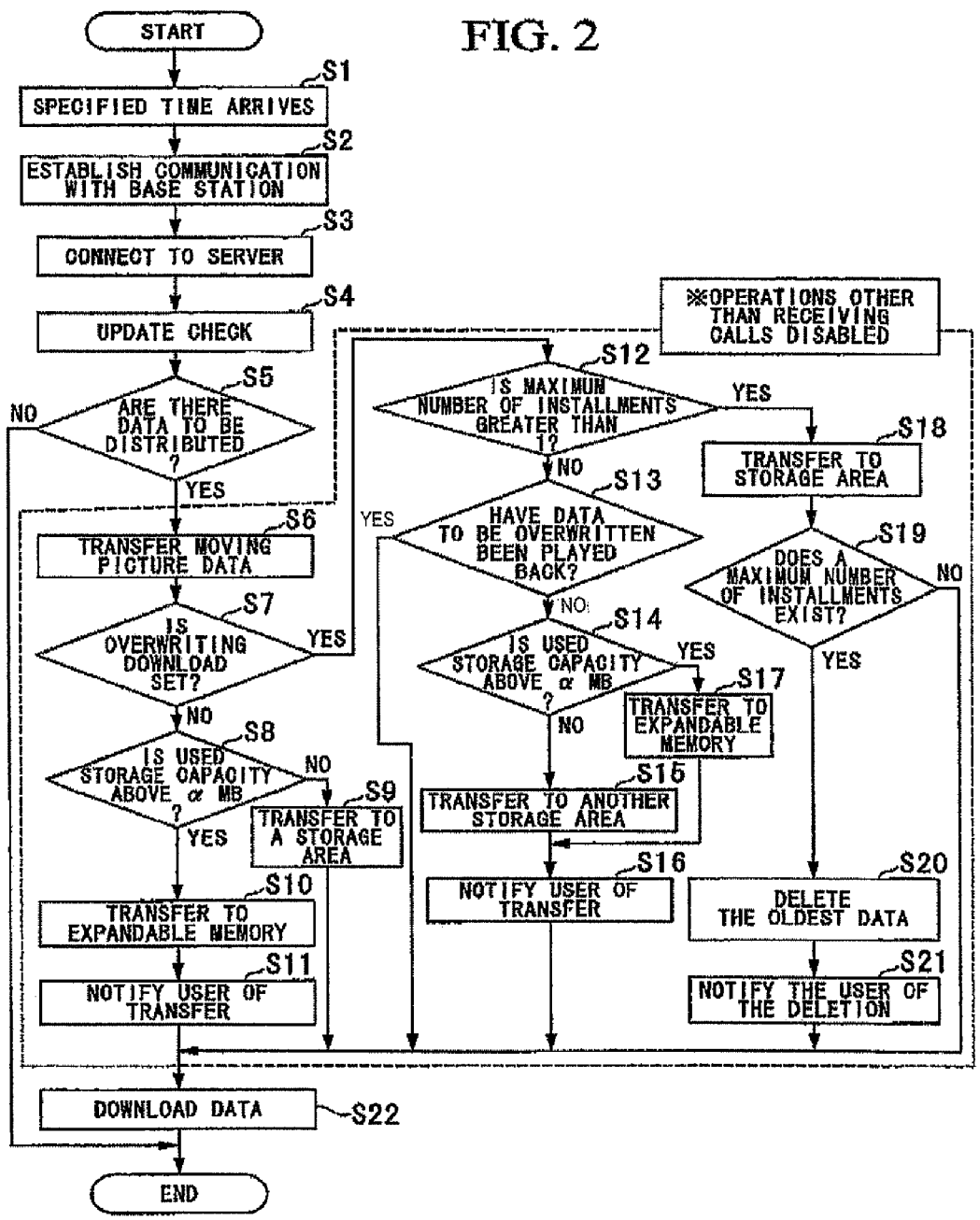
FIG. 2 is a flowchart showing the operation of the portable terminal shown in FIG. 1.
Figures 4, 5:
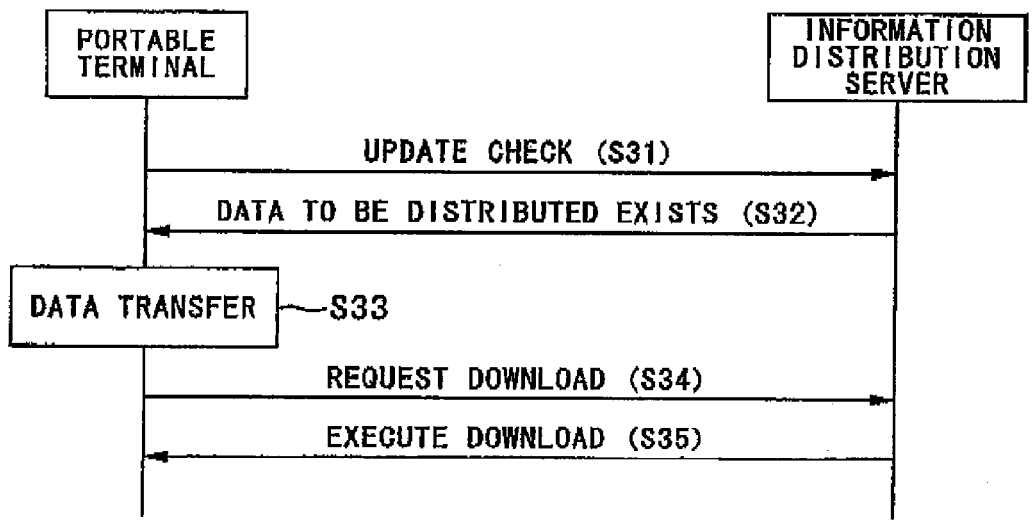
FIG. 4 is a sequencing chart showing the operation of the portable terminal and the information distribution server shown in FIG. 1.
FIG. 5 is an explanatory diagram showing the constitution of the data stored in the storage unit and the expandable memory shown in FIG. 1.

Next, the detailed operation of the data transfer process (step S33) shown in FIG. 4 shall be explained, referring to FIG. 2.

The user registers beforehand with the information distribution server 13 to receive the moving picture distribution service. Also, in the case of downloading data, in addition to setting whether to overwrite data or transfer to a storage area that is called a data folder without overwriting, the maximum number of episodes to be kept in the portable terminal 1 is set.

When the time of day designated from the information distribution server 13 is reached (step S1), the control unit 2 issues an instruction to the communication unit 6 to establish wireless communications with the base station 11. Upon receiving the instruction, the communication unit 6 establishes communication with the base station 11 (step S2). When communication with the base station 11 is established, the control unit 2 connects to the information distribution server 13 (step S3).

Next, the control unit 2 performs an update check with the information distribution server 13 (step S4), and determines whether or not there exists data (moving picture data) to be distributed (step S5). The control unit 2 terminates the process in the event there being no data to be distributed.

On the other hand, if data (moving picture data) to be distributed does exist, the data transfer process is started (step S6). While the data transfer process is being executed (steps S7 to S21), the control unit 2 disables all operations to operate other applications of the portable terminal 1 other than that for answering incoming calls.

The control unit 2 first determines whether the setting has been made to perform overwriting when downloading (step S7). When the result of this determination is that there is no se for overwriting download, the control unit 2 determines whether or not the used storage capacity of the storage unit 9 is greater than a predetermined value (e.g., α MB) (step S8).

When the result of the determination is that the used storage capacity is less than the predetermined value (i.e., when storage area is available), the control unit 2 transfers the data stored in the reserved storage area (prescribed storage area) to another storage area in the storage unit 9 (step S9).

The transfer referred to here involves deleting the original data after copy it to another storage areas. The control unit 2 then downloads the data distributed by the information distribution server 13 and stores it in the reserved storage area in the storage unit 9 (step S22). When the used storage capacity is above the predetermined value, the control unit 2 transfers the data stored in the reserved storage area to the expandable memory 10 (step S10) and informs the user of the fact that the data have been transferred to the expandable memory by displaying in the display unit 4 a message showing that the data have been transferred to the expandable memory (step S11). Then, the control unit 2 downloads the data distributed by the information distribution server 13 and stores it in the reserved storage area of the storage unit 9 (step S22).

Next, when overwriting download has been set, the control unit 2 determines whether or not the maximum number of episodes of the data distributed by the information distribution server 13 is set to more than 1 (step S12). When the result of this determination is that the setting has not been made, the control unit 2 determines whether or not the data stared in the reserved storage area (the data subject to overwriting) has not been played back (step S13). If the result of this determination is that it has been played back, the control unit 2 downloads the data distributed by the information distribution server 13 and stores it in the reserved storage area in the storage unit 9 (step S22).

Thereby, the data that had been stored in the reserved storage area is overwritten by the new data.

On the other hand, if the data currently stored in the reserved storage area (the data to be overwritten) are yet to be played back, the control unit 2 determines whether or not the used storage capacity of the storage unit 9 is greater than a predetermined value (e.g., α MB) (step S14). If the result of this determination is that the used storage capacity is less an the predetermined value (i.e., when storage area is available), the control unit 2 transfers the data currently stored in the reserved storage area to another storage area (step S15), and informs the user of the transfer of the data by displaying in the display unit 4 a message showing that the data have been transferred to another storage area (step S16). On the other hand, if the used storage capacity is greater than a predetermined value, the control unit 2 transfers the data currently stored in the reserved storage area to the expandable memory 10 (step S17), and informs the user of the transfer of the data by displaying in the display unit 4 a message showing that the data have been transferred to the expandable memory (step S16). Then, the control unit 2 downloads the data distributed by the information distribution server 13 and stores it in the reserved storage area of the storage unit 9 (sap S22).

Next, when the maximum number of episodes is set to more than 1, the control unit 2 transfers the data stored in the reserved storage area to the series data storage area in another storage area (step 18). Then, the control unit 2 determines whether or not the preset maximum number of episodes of data currently exists in the series data storage area in the storage unit 9 (step S19). If the result of this determination is that the maximum number does not yet exist, the control unit 2 downloads the data distributed by the information distribution server 13 and stores it in the reserved storage area in the storage unit 9 (step S22). On the other hand, if the maximum number of data already exists, the control unit 2 deletes like oldest data (step S20), and informs the use of the fact that data have been deleted by displaying in the display unit 4 a message showing that the data have been deleted (step S21). Then, the control unit 2 downloads the data distributed by the information distribution server 13 and stores it in the reserved storage area of the storage unit 9 (step S22).

Thus, the data update check is performed, and when there exists data to be downloaded, in the case of the reserved storage area at which the moving picture data are to be housed being set for no overwriting the previously downloaded moving picture data are automatically transferred to an appropriate folder. Even if the reserved storage area at which the moving picture data are to be housed is set for overwriting, when the maximum number of episodes is more than 1, the previously downloaded moving picture data are automatically transferred to an appropriate storage area. If the used storage capacity is above a certain level, or the storage area is full, it can be automatically transferred to an expandable memory or the like. Thereby, it is possible to prevent overwriting of yet-to-be-played-back data in the reserved storage area for the distribution service located in the storage unit 9, thus effectively utilizing the memory capacity of the storage unit 9.

Also, when the maximum number of episodes is more than one in the case of the reserved storage area at which the moving picture data are to be housed being set for overwriting, if transferring the previous moving picture data to the storage area causes the number of moving picture data to exceed the maximum number of episodes, the oldest one in the storage area is deleted. Since deleting is not performed in the case of the moving picture data set for deletion having not been played back even once, the downloaded data can be reliably protected.

Also, designating overwriting after downloading allows the maximum number of episodes to be set as the number of episodes data allowed to remain. For example, when series moving picture data are set to overwriting download, in the case of the maximum number of episodes being set to "3", the program data are distributed, and the first through third episodes are automatically saved in the storage area. When the fourth episode is to be transferred to the storage area, the oldest moving picture data in the storage area, that is, the first episode, is deleted. Likewise, when the fifth episode is to be transferred, the second episode is deleted, and so on, so that three moving picture data older that the downloaded moving picture data are saved.

Also, when the moving picture data to be downloaded is set to not for overwriting (that is, the data that already exist in the reserved storage area are automatically transferred), or in the case of being set to overwriting download and the maximum number of episodes being greater than 1 (when the maximum number of episodes is 1, since overwriting is performed without data transfer the conditions are not met), then the data to be transferred can be automatically transfer to the respective storage area according to the title, day, moving picture data classification (informative type, series type, onetime type, etc.). Moreover, it is possible for the user to create a storage area and set the moving picture data to be transferred to that storage area.

After registration of a program, when moving picture data are to be distributed for the first time, a storage area is automatically created, and the name of the created storage area may be changed to the title or day. Also, the name of the storage area can be changed by the user.

Also, the portable terminal 1 need not be provided with the expandable memory 10, in which case in order to be able to respond to the case of not being able to asker moving picture data to an appropriate storage area in the storage unit 9 when the available capacity of the storage area is insufficient, after downloading is complete the available capacity of the storage area is always confirmed to check whether or not the next download is possible. For example, when the available capacity of the storage area falls to less than the maximum size of moving picture data that can be distributed, it is possible to inform the user of this fact in advance with a warning message such as "Cannot transfer at next download due to low storage capacity, forcing overwriting".

Also, in addition to automatically deleting the oldest moving picture data that have been played back, moving picture data that have been set for overwriting download and yet have not been played back are also deleted if they precede moving picture data that have been played back. This is based on the reasoning that since the subsequent moving picture data have been played back, the probability of the previous moving picture data being played back is low. Therefore, it is possible to sufficiently ensure the storage capacity. In addition, it is possible to effectively use the storage area by giving a confirmation message such as "Are you sure you want to delete (filename)?" when deleting data.

Also, when the size of the moving picture data is above a certain value (for example, one half or two-thirds of the maximum size of moving picture that can be distributed), or when the available space of the storage area is low, by transferring it to the expandable memory 10, the downloaded data can be reliably protected. The threshold value for the size of the moving picture data to be moved to the expandable memory 10 may be set by the user in the form of "greater than α Mbytes".

Also, regarding the aforementioned processing operation automatically performed by the portable terminal 1, notifications to the user such as "A storage area was created", "Unplayed data have been moved", and "Transferred to SD card due to large size" are shown as messages in the standby display. By notifying an easily understood manner such as display an icon next to a storage area containing unplayed moving picture data, the user can grasp the content of the processing that was automatically performed by the portable terminal 1.

Figure 3:
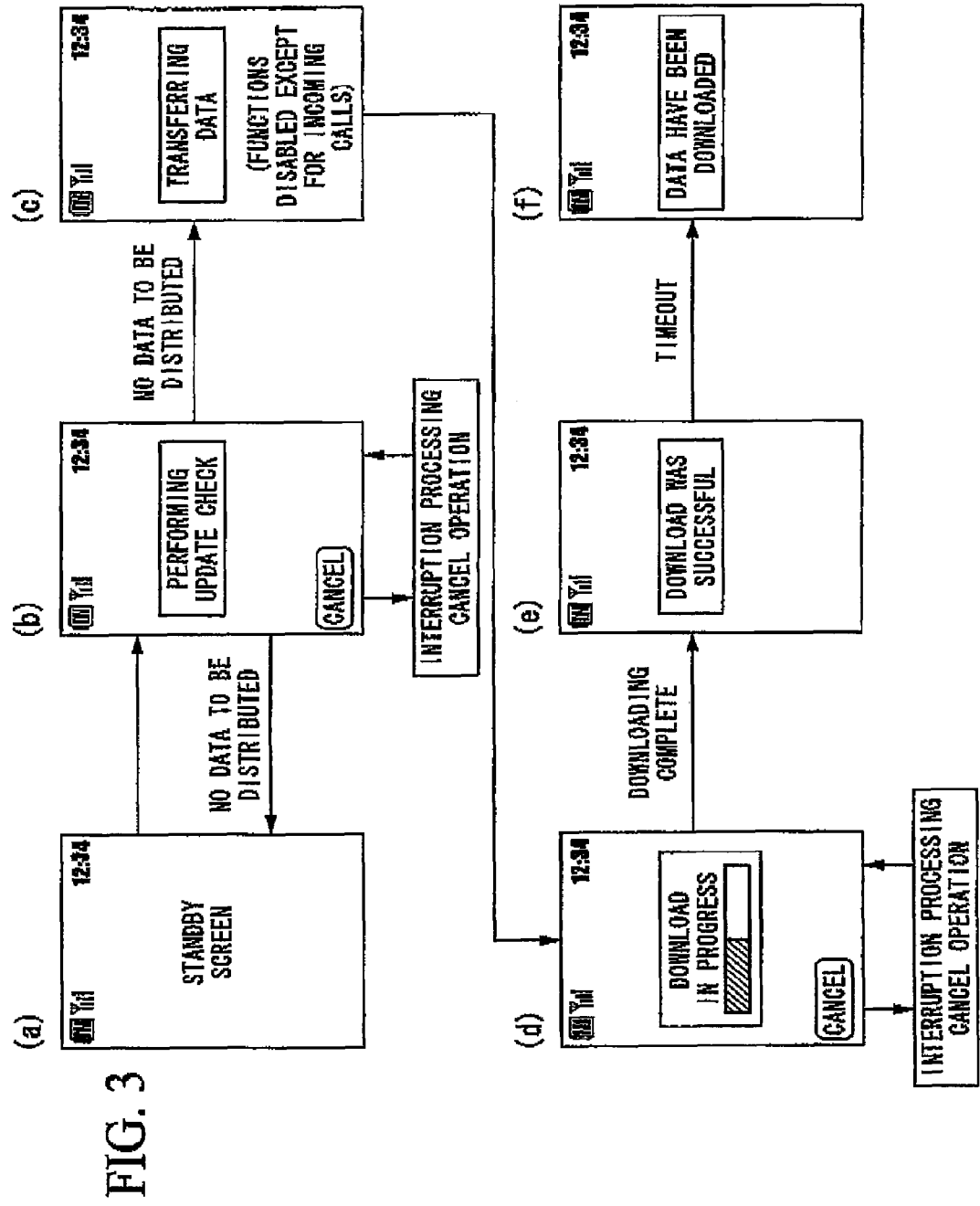
FIG. 3 is an explanatory diagram showing the screen transition during data download.

Next, the screen transition of the display unit 4 during data downloading and data transfer processing shall be explained, referring to FIG. 3.

First, the normal standby screen (part (a) of FIG. 3), at the arrival of the predetermined time, the update check is performed (part (b) of FIG. 3), when there are no data to be distributed as a result of the update check, the display returns to the standby screen (part (a) of FIG. 3). If, on the other hand, here exists data to be newly distributed, a screen appears showing that preparations are in progress for starting the download (part (c) of FIG. 3). At this time, it is checked whether the setting has been made for overwriting the data housed in the reserved storage area or the setting has been made to transfer the data, and the corresponding operation is performed. While the process of transferring the data is being performed, interruptions other than incoming calls are not accepted.

Next, when the data transfer process is complete, downloading bet during which a screen showing that downloading is in progress is shown (part (d) of FIG. 3). When downloading is complete, a screen saying "Download was successful" appears (part (e) of FIG. 3), and by timing out the display returns to the standby screen, where a notice such as "Data have been downloaded" is shown (part (f) of FIG. 3).

When an interruption occurs during the update check or downloading, the processing being executed is halted, and after the interrupt processing is completed, the hatted processing resumes. An interruption processing here refers to a processing with a higher priority than the current processing, such as receiving a call or mail and responding to an alarm or the like. Also, performing a cancel operation (such as pressing the end key, the clear key, or other such key that causes the cancellation of an operation) causes the current processing to be forcibly ended.

Thus, checking for an update data is performed, and when new data to be downloaded is confirmed, or at the arrival of the next scheduled update date and time determined in advance, the previously downloaded data are automatically transferred to another storage area. Therefore, storage area for the data to be newly downloaded can be reliably secured. Also, when downloading, the user can voluntarily set whether the data that are already in the reserved storage area should be overwritten or transferred, the organization of distribution data categories, and the maximum number of data to be saved in the case of overwrite saving being designated. Therefore, the memory capacity can be managed under the specified conditions.

Also, after downloading is completed, the available capacity of the storage area is confirmed. When the available capacity of the storage area is less than the maximum size of data that can be distributed, a message is displayed or data satisfying specific conditions are automatically deleted. This enables efficient management of the storage area. Also, with regard to items that require notification of the user among the processing operations that are automatically performed, messages such as "A storage area was created" and "Moved to SD card due to large size" are displayed in the standby display, and easily understandable notifications are made to the user such as showing icons next to the storage area containing unplayed data. Therefore the user can easily grasp the content of the automatically performed processing.

As explained above, prior to the execution of downloading, data that the user wishes to save can be automatically transferred to a storage area that is automatically created or to a specified storage area. Also, the user is not required to perform complicated operations since the storage area for housing the data is automatically created and the setting automatically made for transfers to be made to that storage area from the next download onward, thereby lessening the burden on the user. Moreover, the user can sort and delete downloaded data without performing complicated operations, and the downloaded data can be efficiently stored in a storage area.

Also, even for data which are set for overwriting download, if it is data that have not been played back then overwriting will not occur. Therefore, not only are unwatched data not deleted, but it is possible to prevent communication fees from being wasted.

Also, by distinguishing between data that are overwritten and data that are saved, the small storage area of a portable terminal can be efficiently utilized. In addition, when the used storage area is above a certain level, data can be automatically transferred to an expandable memory. Moreover, since data are housed in the reserved storage area for storage service until the next download starts, the space in the storage area can be utilized without creating wasted space.

Also, when the free space of the storage area is low, since the capacity is ensured by automatic deletion and notifications to the user, situations in which downloading cannot be performed due to a capacity shortage can be greatly minimized.

Also, even when the setting is made for overwriting downloads since it is made possible to set a maximum number of data to be saved, it is possible to review the previous one or previous two data. In addition, organizing related data in a single storage area can save time when searching for data. Also, by notifying the user in an easily understood manner such as with icons, the user can grasp the contents of the automatically executed processing.

In the aforementioned explanation, as a mode of distributing data from the information distribution server 13, it was explained that the download operation involves a download request being made from the portable terminal 1 to the information distribution server 13 after establishing communications with the information distribution server 13. However, the mode of data distribution is not limited thereto. For example, a Broadcast Multicast Service (BCMCS) may be used in which a single line is simultaneously received by multiple portable terminals by enabling a portion of a communications channel, called a broadcast channel, to be used by all portable terminals. Since by using this data distribution format there is no need for portable terminals to establish individual wireless connections, high-volume data distribution such as news and movies becomes possible, and the utilization efficiency of radio channels can be increased. Also, since control at the base station unit is possible, information related to particular regions can be distributed, in contrast to general wide-area broadcasts. In addition, the portable terminal described above includes personal data assistants (PDA), portable terminals, car navigation devices and the like that have a mobile telephone function using mobile communications and a mobile communication function.

The program for realizing the functions of the processing unit in FIG. 1 may be recorded in a computer-readable recording medium, with the data download processing executed by having the program recorded in the recording medium read into a computer system. A "computer system" referred to here includes an operating system and hardware such as peripherals and the like. Also, the "computer system" includes a World Wide Web system equipped with a homepage provision environment (or display environment). Also, a "computer-readable recording medium" refers to a portable medium such as a flexible disk, magneto-optical disk, ROM, CD-ROM and the like, and a recording device such as a hard disk that is housed in a computer system. Moreover, a "computer-readable recording medium" includes a medium that retains a program for a limited period, as in the case of a server when a program is transmitted via a network such as the Internet and communication lines such as telephone lines, and volatile memory (RAM) in a computer system that forms a client.

Also, the aforementioned program may be transmitted from a computer system that stores the program in a storage device to another computer system via a transmission medium or by transmission waves in a transmission medium. Also, the aforementioned program may be one for realizing some of the aforementioned functions. Moreover, it may be a so-called differential file (differential program), in which the aforementioned functions can be realized by combinations of programs already stored in the computer system.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An information receiving apparatus comprising:
    a communication unit that receives distribution data sent from an information distribution server;
    a storage unit that stores the distribution data in a first storage area;
    an expandable memory that stores the distribution data removed from the storage unit;
    a control unit that requests the distribution data via the communication unit, wherein
    the control unit removes the distribution data from the first storage area before requesting a download to the information distribution server and after a discrete number of distribution data files stored in the first storage area reaches a predetermined maximum number, and transfers the distribution data to a second storage area of the storage unit or to the expandable memory; and
    wherein the control unit determines whether a used storage capacity in the storage unit is greater than a predetermined value, and the control unit removes the distribution data from the first storage area and transfers the distribution data to the expandable memory when the used storage capacity in the storage unit is greater than the predetermined value, and removes the distribution data from the first storage area and transfers the distribution data to the second storage area of the storage unit when the used storage capacity in the storage unit is not greater than the predetermined value.

2. The information receiving apparatus according to claim 1, wherein when a first timing arrives, the communication unit receives the distribution data, and the storage unit stores the distribution data in the first storage area, and the control unit removes the distribution data from the first storage area and transfers the distribution data to the second storage area or to the expandable memory at a second timing that is a timing before the first timing.

3. The information receiving apparatus according to claim 2, wherein the first timing is a time of day that is designated by a server that performs distribution control of the distribution data.

4. The information receiving apparatus according to claim 3, wherein the second timing is a time of day that is before prescribed period from the first timing.

5. The information receiving apparatus according to claim 2, wherein the second timing is a time of day that is designated by a server that performs distribution control of the distribution data, and the first timing is the timing at which the control unit removes the distribution data from the first storage area and transfers the distribution data to the second storage area or to the expandable memory.

6. The information receiving apparatus according to claim 1, wherein the control unit performs a data existence confirmation process that confirms whether or not there exists distribution data to be acquired by the storage unit, and in the case of being judged to exist the distribution date to be acquired by the data existence confirmation process, the control unit removes the distribution data from the first storage area and transfers the distribution data to the second storage area or to the expandable memory.

7. The information receiving apparatus according to claim 1, wherein if another application is running when the control unit is to remove the distribution data from the first storage area, the control unit removes the distribution data from the first storage area after the completion of the running of the other application.

8. The information receiving apparatus according to claim 1, wherein the control unit inhibits the operation of other applications when the control unit removes the distribution data from the first storage area.

9. The information receiving apparatus according to claim 1, wherein when overwriting of the distribution data stored in the first storage area of the storage unit is not permitted, the control unit transfers the distribution data stored in the first storage area to the second storage area of the storage unit.

10. The information receiving apparatus according to claim 1, wherein when the distribution data stored in the first storage area of the storage unit has not been played back, the control unit transfers the distribution data stored in the first storage area to the second storage area of the storage unit.

11. The information receiving apparatus according to claim 1, further comprising a notification unit that notifies whether or not the data stored in the first storage area of the storage unit have been removed and transferred by the control unit.

12. The information receiving apparatus according to claim 1, wherein when overwriting of the distribution data stored in the first storage area of the storage unit is permitted, the control unit secures the storage area by deleting the distribution data.

13. A data downloading method in an information receiving apparatus that has a communication unit that receives distribution data sent from an information distribution server, comprising the steps of:
    storing the distribution data acquired via the communication unit in a first storage area of a storage unit that is determined in advance;
    in order to secure a storage area for the distribution data, removing the distribution data that are stored in the first storage area of the storage unit before a download request to the information distribution server is made and after a discrete number of distribution data files stored in the first storage area reaches a predetermined maximum number, and transferring the distribution data to a second storage area of the storage unit or to an expandable memory; and determining whether a used storage capacity in the storage unit is greater than a predetermined value; and removing the distribution data from the first storage area and transferring the distribution data to the expandable memory when the used storage capacity in the storage unit is greater than the predetermined value, and removing the distribution data from the first storage area and transferring the distribution data to the second storage area of the storage unit when the used storage capacity in the storage unit is not greater than the predetermined value.

14. An information receiving system comprising:

a data distribution server that distributes distribution data;

a receiving apparatus that has a communication unit that receives the distribution data distributed from the data distribution server;

a storage unit that stores the distribution data in a first storage area;

an expandable memory that stores the distribution data removed from the storage unit;

a control unit that requests the distribution data via the communication unit, wherein the control unit removes the distribution data from the first storage area before requesting a download to the data distribution server and after a discrete number of distribution data files stored in the first storage area reaches a predetermined maximum number, and transfers the distribution data to a second storage area of the storage unit or to the expandable memory; and wherein the control unit determines whether a used storage capacity in the storage unit is greater than a predetermined value, and the control unit removes the distribution data from the first storage area and transfers the distribution data to the expandable memory when the used storage capacity in the storage unit is greater than the predetermined value, and removes the distribution data from the first storage area and transfers the distribution data to the another storage area of the storage unit when the used storage capacity in the storage unit is not greater than the predetermined value.

* * * * *